US012683536B2

(12) United States Patent
Shibuya et al.

(10) Patent No.: US 12,683,536 B2
(45) Date of Patent: Jul. 14, 2026

(54) CERAMIC FILM, METHOD FOR MANUFACTURING THE SAME, EMITTER, AND THERMOPHOTOVOLTAIC POWER GENERATION DEVICE

(71) Applicant: NEC CORPORATION, Tokyo (JP)

(72) Inventors: Taizo Shibuya, Ibaraki (JP); Akinobu Shibuya, Ibaraki (JP); Takashi Miyazaki, Ibaraki (JP); Kentaro Shinoda, Ibaraki (JP); Jun Akedo, Ibaraki (JP); Mohammed Shahien Yamada, Ibaraki (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 18/857,385

(22) PCT Filed: Apr. 21, 2023

(86) PCT No.: PCT/JP2023/015991
§ 371 (c)(1),
(2) Date: Oct. 16, 2024

(87) PCT Pub. No.: WO2023/204309
PCT Pub. Date: Oct. 26, 2023

(65) Prior Publication Data
US 2025/0286497 A1      Sep. 11, 2025

(30) Foreign Application Priority Data
Apr. 22, 2022     (JP) ................................. 2022-070623

(51) Int. Cl.
H02S 10/30          (2014.01)
F23D 14/12          (2006.01)

(52) U.S. Cl.
CPC .............. *H02S 10/30* (2014.12); *F23D 14/12* (2013.01); *C04B 2237/704* (2013.01)

(58) Field of Classification Search
None
See application file for complete search history.

(56) References Cited

U.S. PATENT DOCUMENTS 6,426,154 B1 *  7/2002  Naba ................... H05K 1/0271
                                          428/629
2017/0012199 A1 *  1/2017  Sabry ................... G01J 3/0237

FOREIGN PATENT DOCUMENTS

CN       109295451 A      2/2019
DE       19643148 A1 *  4/1998  ............. B32B 18/00
(Continued)

OTHER PUBLICATIONS

Machine translation of JP2018090463A (Year: 2018).*
(Continued)

*Primary Examiner* — Ryan S Cannon
(74) *Attorney, Agent, or Firm* — Sughrue Mion, PLLC

(57) ABSTRACT

A ceramic film for a TPV power generation device, the ceramic film having a sufficiently high strength thus making it possible to obtain a desirable radiation spectrum, is provided. A ceramic film (20) according to an example embodiment is a ceramic film that is formed on a base material and has pores, and includes a plurality of high-density regions (1) having a density higher than an average density of the entire ceramic film and a plurality of low-density regions (2) having a density lower than the average density of the entire ceramic film. Further, the high-density regions (1) and the low-density regions (2) are stacked in layers. The ceramic film is composed of an oxide ceramic containing a rare-earth element.

8 Claims, 7 Drawing Sheets

<u>20</u>

(56) References Cited

FOREIGN PATENT DOCUMENTS

| GB | 2149771 A | * | 6/1985 | ........... F27D 1/0009 |
|----|-----------|---|--------|--------------------------|
| JP | 11-264059 A | | 9/1999 | |
| JP | 2014-512160 A | | 5/2014 | |
| JP | 2018-90463 A | | 6/2018 | |
| JP | 6620751 B2 | | 12/2019 | |
| JP | 2020-57522 A | | 4/2020 | |
| WO | 2016/042749 A1 | | 3/2016 | |

OTHER PUBLICATIONS

Machine translation of CN109295451A (Year: 2019).*
Machine translation of DE19643148A1 (Year: 1998).*
W.J. Tobler "High-performance selective Er-doped YAG emitters for thermophotovoltaics," Applied Energy, 2008, vol. 85, pp. 483-493, 11 pages.
A. Licciulli et al., "Porous Garnet Coatings Tailoring the Emissivity of Thermostructural Materials," Journal of Sol-Gel Science and Technology, 2004, vol. 32, pp. 247-251, 5 pages.
International Search Report for International Application No. PCT/JP2023/015991 dated Jul. 4, 2023.

* cited by examiner

HEAT → 101A → INFRARED LIGHT → 102 → ELECTRIC POWER →

100

20

1

2

20

20

AT TIME OF
DEPOSITION

AT TIME OF
HEATING $20\,\mu m$ $10\,\mu m$

2 μm

2 μm

CERAMIC FILM, METHOD FOR MANUFACTURING THE SAME, EMITTER, AND THERMOPHOTOVOLTAIC POWER GENERATION DEVICE

This is a National Stage Application of International Application No. PCT/JP2023/015991 filed Apr. 21, 2023, claiming priority based on Japanese Patent Application No. 2022-070623 filed Apr. 22, 2022.

TECHNICAL FIELD

The present disclosure relates to a ceramic film, a method for manufacturing the same, an emitter, and a thermophotovoltaic power generation device.

BACKGROUND ART

Thermophotovoltaic (Thermo-Photo-Voltaic (TPV)) power generation is a technique of converting thermal radiation to electric power using a photoelectric conversion cell. It is expected that power generation will become highly efficient by controlling a radiation spectrum. Further, TPV power generation can be applied to a wide range of applications because it allows use of a variety of thermal sources, and is attracting attention as a power generating technology with a high energy density per unit weight.

FIG. 14 shows a basic configuration of a TPV power generation device. A TPV power generation device 100 shown in FIG. 14 converts heat generated from combustion equipment or heat generated by condensing solar light to an infrared light by an emitter 101, allows the radiated infrared light to enter a photoelectric conversion (Photo-Voltaic (PV)) cell 102, and converts the infrared light to electric power.

It has been suggested that the emitter 101 can be made of a variety of materials. In order to obtain highly efficient thermophotovoltaic power generation, it is required to narrow down the spectrum of the infrared light radiated by the emitter 101 to a wavelength that matches the photoelectric conversion cell 102. While studies have been progressing that an emitter can be made of a photonic crystal and metamaterials, it is difficult for such an emitter to be made large, have a high heat resistance, and be reduced in cost. One of the measures suggested for solving these above problems is to provide an emitter made of ceramics.

Patent Literature 1 discloses a ceramic emitter including a polycrystalline body that has a garnet structure represented by a compositional formula $R_3Al_5O_{12}$ or $R_3Ga_5O_{12}$ (R: rare-earth element) and has pores of a porosity of not less than 20% and nor more than 40% inside the polycrystalline body. The pores include a portion where the pores are connected to one another but not linearly continuous. An excellent wavelength selectivity can be obtained by not including a part where the pores are linearly continuous from a heat supply surface to a radiation surface of the ceramic emitter.

Further, Non-Patent Literatures 1 and 2 each report an example in which a ceramic film is applied as an emitter of a TPV power generation device. Non-Patent Literature 1 discloses an emitter in which an $Er_{1.5}Y_{1.5}Al_5O_{12}$ ceramic film is formed on an $MoSi_2$ substrate by plasma-spray coating (plasma spraying). Non-Patent Literature 2 discloses an emitter in which an $Er_3Al_5O_{12}$ ceramic film is formed on an SiC substrate by a sol-gel method.

CITATION LIST

Patent Literature

[Patent Literature 1] Japanese Patent No. 6620751

Non-Patent Literature

[Non-Patent Literature 1] W. J. Tobler et al., "High-performance selective Er-doped YAG emitters for thermophotovoltaics", Applied Energy 85, 483-493 (2008)
[Non-Patent Literature 2] A. Licciulli et al., "Porous Garnet Coatings Tailoring the Emissivity of Thermo-structural Materials", Journal of Sol-Gel Science and Technology 32, 247-251 (2004)

SUMMARY OF INVENTION

For example, if a surface of a combustor of a fuel combustion type TPV power generation device can be coated with a ceramic film as an emitter, efficient heat transfer from the thermal source to the emitter can be achieved, whereby it is expected that the efficiency of the power generation device will become high. As described above, a technique for depositing an emitter which can be easily combined with various forms of thermal sources has been desired. However, in general, ceramic films have a problem that they have insufficient strength so that breakage occurs and they peel away from a base material due to a change in a temperature.

Further, although the ceramic film disclosed in Non-Patent Literature 1 is deposited on the base material, this ceramic film is dense and radiation from the base material is transmitted through this ceramic film. Further, while the ceramic film disclosed in Non-Patent Literature 2 is porous, it is difficult to control porosity in a sol-gel method and the porosity is 57%, which is very large. Therefore, there is a problem that the Er ion concentration for causing wavelength selective radiation included in the emitter and the radiation intensity become smaller.

As described above, the ceramic emitter has a problem that it has insufficiently high strength and difficulty in controlling porosity when a film in accordance with the form of the thermal source is formed, which makes it difficult to obtain a desired radiation spectrum.

An object of the present disclosure is to provide a ceramic film having a sufficiently high strength thus making it possible to obtain a desirable radiation spectrum and a method for manufacturing the same, an emitter, and a thermophotovoltaic power generation device.

A ceramic film according to one aspect is a ceramic film that is formed on a base material and has pores, the ceramic film including: a plurality of high-density regions having a density higher than an average density of the entire ceramic film; and a plurality of low-density regions having a density lower than the average density of the entire ceramic film.

A method for manufacturing a ceramic film according to one aspect includes forming the ceramic film on a base material by a plasma-assisted aerosol deposition method.

An emitter according to one aspect converts heat from a thermal source into an infrared light and has the ceramic film formed on the thermal source.

A thermophotovoltaic power generation device according to one aspect includes: an emitter configured to convert heat from a thermal source into an infrared light; and a photoelectric conversion cell configured to convert the infrared light emitted from the emitter into an electric power, in which the emitter is formed of the ceramic film formed on the thermal source.

According to the example embodiment, it is possible to provide a ceramic film having a sufficiently high strength thus making it possible to obtain a desirable radiation spectrum and a method for manufacturing the same, an emitter, and a thermophotovoltaic power generation device.

EXAMPLE EMBODIMENT

In the following description, with reference to the drawings, an example embodiment of the present disclosure will be described in detail. Throughout the drawings, the same or corresponding elements are denoted by the same reference symbols, and redundant description will be omitted as necessary for the sake of clarification of the description.

Figures 1, 2:
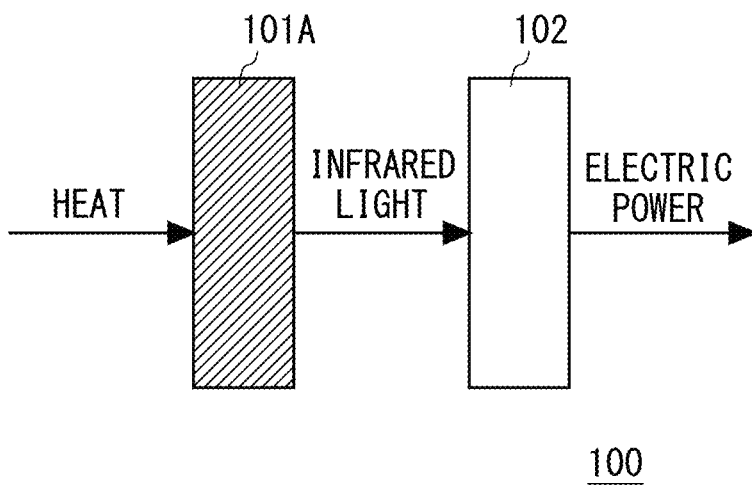
FIG. 1 is a schematic view showing a configuration of a thermophotovoltaic power generation device according to an example embodiment.
FIG. 2 shows a diagram for describing an example of a structure of a ceramic film according to the example embodiment.

The example embodiment relates to a ceramic film used for a wavelength selective emitter of a thermophotovoltaic (TPV) power generation device. FIG. 1 is a schematic view showing a configuration example of a TPV power generation device 100 according to the example embodiment. As shown in FIG. 1, the TPV power generation device 100 according to the example embodiment includes an emitter 101A and a photoelectric conversion cell 102. The emitter 101A converts heat from a thermal source into a thermal radiation light (infrared light).

The thermal source is, for example, combustion equipment that burns fuel mixed with air to generate heat, and the mechanism and the structure of the thermal source are not limited. The fuel may be a liquid fuel or gas. Further, the thermal source may have a configuration that can supply oxygen or the like in place of air. The infrared light after the conversion is emitted from the surface of the emitter 101A.

The photoelectric conversion cell 102 converts the infrared light emitted from the emitter 101A into an electric power. The photoelectric conversion cell 102 is sensitive to a light in a particular wavelength band and has a wavelength band of light that can be photoelectrically converted. Therefore, the wavelength band of the infrared light emitted from the emitter 101A preferably matches a range where the sensitivity of the photoelectric conversion cell 102 is high. A silicon semiconductor, a compound semiconductor or the like is used as the photoelectric conversion cell 102. The electric power generated by the photoelectric conversion cell 102 is collected via a wire that is not shown.

The emitter 101A is a wavelength selectivity thermal radiator provided to cover the surface of the thermal source. The emitter 101A selectively emits a light of a particular wavelength band having a high sensitivity of the photoelectric conversion cell 102. By forming the emitter 101A of a material that selectively emits a light of a particular wavelength band having a high sensitivity of the photoelectric conversion cell 102, the efficiency of the power generation of the TPV power generation device 100 can be improved.

The material of the emitter 101A may be, for example, a ceramic film 20 shown in FIG. 2. FIG. 2 is a diagram showing one example of a structure of the ceramic film 20 according to the example embodiment. This ceramic film 20 is formed on a base material (not shown) and has pores. In this example, the ceramic film 20 is formed on the thermal source, which is a base material.

As shown in FIG. 2, the ceramic film 20 includes, in a film of the same composition, a plurality of high-density regions 1 having a density higher than an average density of the entire ceramic film 20 and a plurality of low-density regions 2 having a density lower than the average density of the entire ceramic film 20. In other words, the porosity of the high-density region 1 is smaller than the average porosity of the entire ceramic film 20 and the porosity of the low-density region 2 is larger than the average porosity of the entire ceramic film 20.

While it is required that a plurality of high-density regions 1 and a plurality of low-density regions 2 be included, the state of the distribution is not limited, and the sizes of the respective regions are also not limited. The size of the particles that form the ceramic film 20 is typically about 0.1 μm to 5 μm. Since the high-density region 1 and the low-density region 2 are composed of a collection of particles, the size of each of the regions is equal to or greater than several μm.

Further, the thickness of the ceramic film 20 is not particularly limited, and may be, for example, not less than 30 μm and nor more than 1 mm. The upper limit of the size of each of the regions is smaller than the film thickness of the ceramic film 20.

Since a layer (low-density region 2) whose porosity is larger than the average porosity is provided in the ceramic film 20, even when thermal expansion and contraction occur at the time of heating and cooling, the low-density region 2 serves as a stress relaxation layer, whereby it is possible to reduce occurrence of peeling or breakage of the ceramic film 20. In order for the low-density region 2 to serve as the stress relaxation layer, the thickness of the low-density region 2 is preferably several μm or larger. However, if the size of the low-density region 2 becomes too big, the mechanical strength of this part is degraded. Therefore, the size is preferably 20 μm or smaller, more preferably 10 μm or smaller.

Further, the particle diameter of each of the ceramic particles in the low-density region 2 is preferably 1 μm or smaller. The reason therefor is that, while the mechanical strength generally becomes small in the region where the porosity is large, the strength can be maintained by forming this region by particles with a large surface energy in which the particle diameter of each of the ceramic particles is 1 μm is lower.

The average porosity of the ceramic film 20 is preferably 20% or higher. Since a thermal radiation light from a thermal source irradiated on the ceramic film 20 is scattered by pores, an amount of the thermal radiation light that transmits through the ceramic film is reduced. On the other hand, the infrared light emitted from the ceramic film 20 has a sufficiently high radiation intensity at a peak wavelength. As a result, a wavelength selective thermal radiation by the ceramic film 20 is achieved.

Further, the average porosity of the ceramic film 20 is preferably 40% or less. The reason therefor is that it can be considered that, when the porosity of the ceramic film 20 becomes large, the ion concentration for causing wavelength selective radiation is reduced, and the radiation intensity of the peak wavelength of the infrared light is reduced.

Further, when the porosity of the ceramic is 40% or higher, pores are coupled to each other and a linear space is formed, and a thermal radiation light from the thermal source is transmitted. This impairs the wavelength selectivity of the emitter 101A. Further, when the porosity of the ceramic is 40% or higher, the mechanical strength thereof becomes so small that it cannot be used properly as the emitter 101A of the TPV power generation device 100. Accordingly, it is desirable that unnecessary thermal radiation light from the thermal source be reduced and porosity be not less than 20% and not more than 40% in order to obtain a radiation intensity of a desired peak wavelength.

Figure 3:
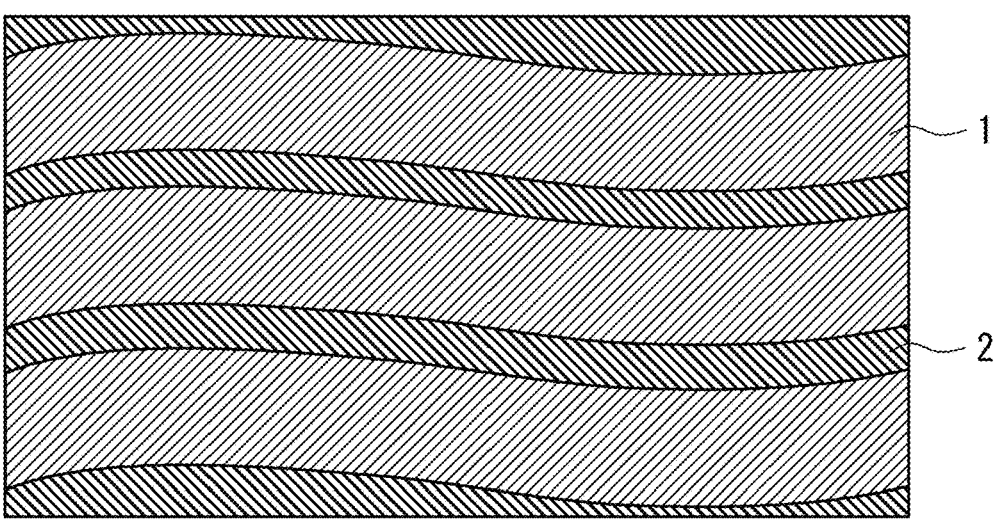
FIG. 3 is a diagram for describing another example of the structure of the ceramic film according to the example embodiment.

As shown in FIG. 2, the high-density regions 1 and the low-density region 2 are preferably stacked in layers. In the example shown in FIG. 2, the high-density regions 1 and the low-density regions 2 having a constant thickness are alternatively stacked in layers. Note that the interface of each layer is not necessarily smooth. For example, as shown in FIG. 3, the interface between the high-density region 1 and the low-density region 2 may be corrugated.

Figure 4:
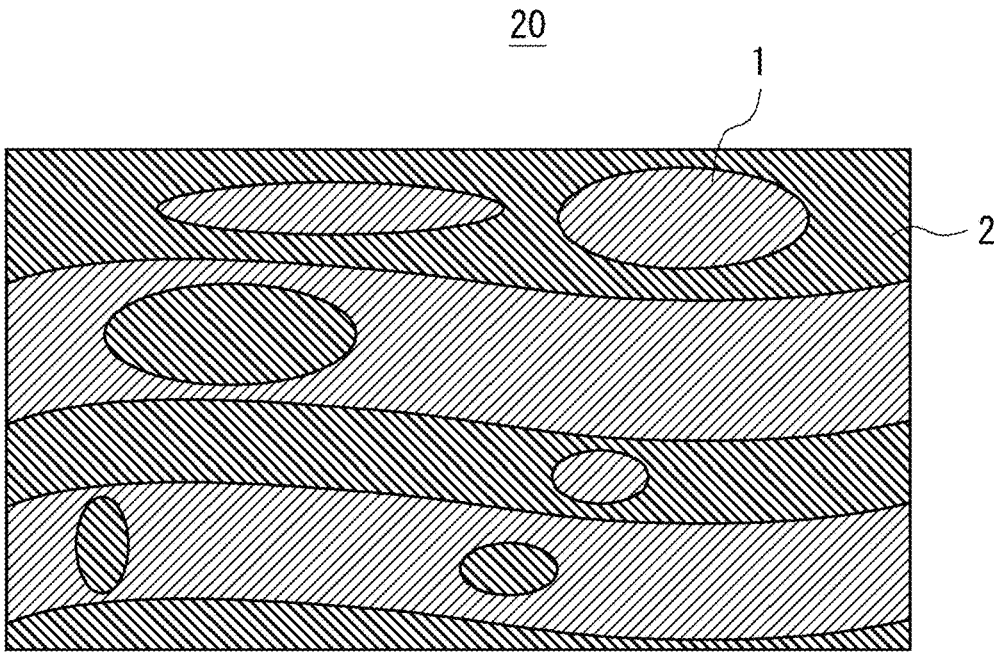
FIG. 4 is a diagram for describing another example of the structure of the ceramic film according to the example embodiment.

Further, as shown in FIG. 4, the layer of one region may include the other region. In the example shown in FIG. 4, the high-density regions 1 and the low-density regions 2 are stacked in layers, and the layer of the high-density region 1 includes a plurality of low-density regions 2 having different sizes that are elliptical in cross section, and the layer of the low-density region 2 includes a plurality of high-density regions 1 having different sizes that are elliptical in cross section.

The composition of the ceramic film 20 is not particularly limited. Since the ceramic film 20 is intended to be used as the photoelectric conversion cell 102 of the TPV power generation device 100, the ceramic film 20 is preferably composed of oxide ceramic containing a rare-earth element. More preferably, the composition of the ceramic film 20 is $R_3Ga_5O_{12}$ or $R_3Al_5O_{12}$ (R: rare-earth element).

Figure 5:
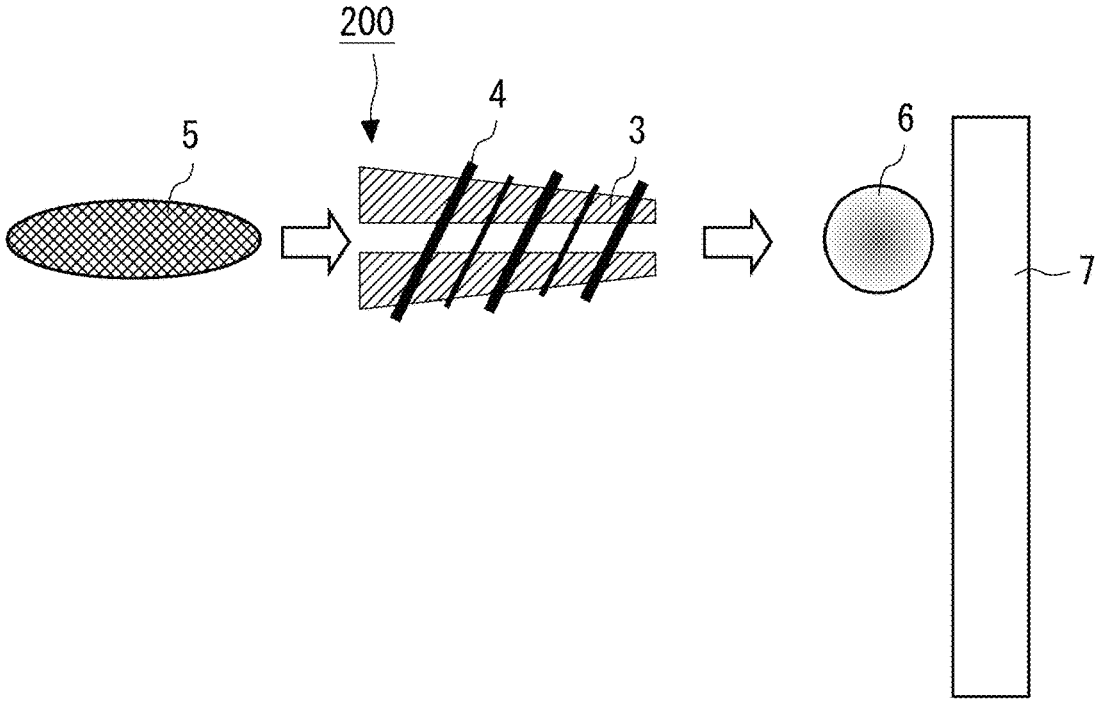
FIG. 5 is a schematic view for describing a method for manufacturing the ceramic film according to the example embodiment by a plasma-assisted aerosol deposition device.
Figure 6:
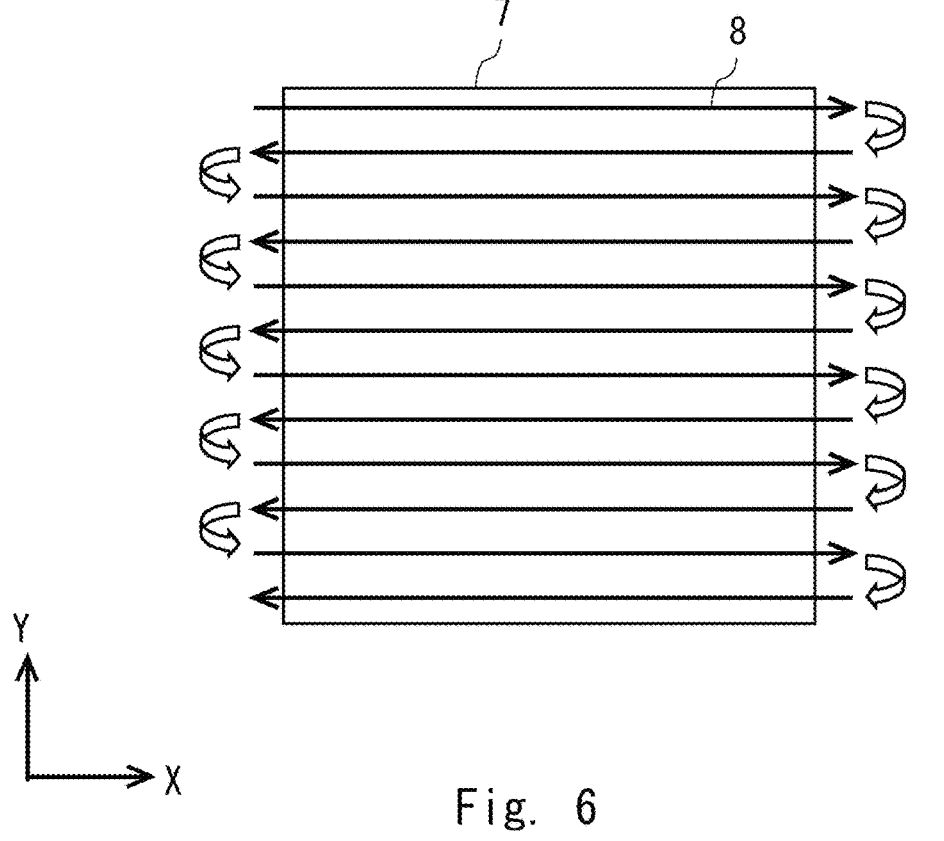
FIG. 6 a schematic view for describing the method for manufacturing the ceramic film according to the example embodiment by the plasma-assisted aerosol deposition device.

Referring next to FIGS. 5 and 6, a method for manufacturing the ceramic film 20 according to the example embodiment will be described. The method for manufacturing the ceramic film 20 is preferably, but not limited to, a deposition method that uses a plasma-assisted aerosol deposition method. FIGS. 5 and 6 are schematic views for describing the method for manufacturing the ceramic film according to the example embodiment by a plasma-assisted aerosol deposition device 200.

The plasma-assisted aerosol deposition method is a method for performing deposition by an aerosol deposition method (AD method) while assisting energy by plasma. The "aerosol" here means fine solid or liquid particles floating in the gas. The "AD method" is a deposition method for depositing powder by generating aerosol including raw powder and spraying them from the nozzle to the base material.

FIG. 5 shows a part of the configuration of the plasma-assisted aerosol deposition device 200. As shown in FIG. 5, the plasma-assisted aerosol deposition device 200 includes a nozzle 3 and a high-frequency (RF) coil 4. By introducing a gas into a vessel (not shown) that contains a ceramic powder having a composition the same as that of the ceramic film 20 to be deposited, a ceramic powder aerosol 5 is generated. The ceramic powder aerosol 5 is sprayed from the nozzle 3 including the RF coil 4.

The RF coil 4 is a part of a plasma generation device. The ceramic powder aerosol 5 is introduced into the RF coil 4 and is thus made to pass through a plasma to become an aerosol passing plasma part 6. The aerosol passing plasma part 6 impinges on a base material 7 provided in a depressurized chamber (not shown), and the ceramic film 20 is deposited on the base material 7 at a room temperature.

The gas carrying the ceramic powder aerosol 5 and the aerosol passing plasma part 6 is, for example, but not limited to, Ar or He. The nozzle 3 may have any shape. The shape of the outlet of the nozzle 3 may be, for example, circular. By moving a stage (not shown) on which the base material 7 is placed in such a way that the center of the outlet of the nozzle 3 scans on the base material 7, the ceramic film 20 is formed over the entire base material 7. Note that the base material 7 may be fixed and a movable nozzle 3 may be used. Alternatively, both the base material 7 and the nozzle 3 may be movable ones.

The average porosity of the ceramic film 20 can be controlled by various deposition parameters (gas flow rate, chamber pressure, plasma power, stage movement speed, etc.) Further, a part of the ceramic film 20 having a small porosity (high-density region 1) and a part of the ceramic film 20 having a large porosity (low-density region 2) are obtained, for example, by changing the deposition parameters during the deposition.

Further, it is possible to form the high-density regions 1 and the low-density regions 2 by moving the stage on which the base material 7 is placed and causing the center of the outlet of the nozzle 3 to scan on the base material 7. FIG. 6 shows a nozzle center trajectory 8 on the base material 7. In the example shown in FIG. 6, as the stage moves, the nozzle 3 proceeds in the +X direction from the top left of the base material 7, then moves in the −Y direction at the right end of the base material 7 by a predetermined step and folds back, and then proceeds in the –X direction. By repeating this movement, the nozzle center trajectory 8 shown in FIG. 6 is obtained.

While the aerosol passing plasma part 6 sprayed from the nozzle 3 has normally has a diameter of 10 mm or larger, the plasma intensity and the particle concentration in the aerosol passing plasma part 6 have a spatial distribution. Therefore, the ceramic film 20 that first adheres to the base material 7 includes a region where the density is large and a region where the density is small.

Since the aerosol passing plasma part 6 moves and is deposited sequentially in the state where there are a part where the density is large and a part where the density is small, there are also a region where the density is large and a region where the density is small in the thickness direction of the ceramic film 20 as well. Further, as shown in the nozzle center trajectory 8 in FIG. 6, at the time of deposition, the base material 7 is moved, whereby the nozzle 3 performs step movement in the –Y direction. The distance of the step movement in the –Y direction is sufficiently smaller than the size of the aerosol passing plasma part 6 sprayed onto the base material 7. Therefore, it becomes possible to further generate a distribution of a region where the porosity is large and a region where the porosity is small.

As described above, according to the example embodiment, it is possible to easily form a region having a porosity smaller than the average porosity (high-density region 1) and a region having a porosity larger than the average porosity (low-density region 2) in the ceramic film 20 of the same composition by a deposition method using the plasma-assisted aerosol deposition method.

Hereinafter, specific Examples of the emitter 101A of the TPV power generation device 100 will be described.

Example 1

In Example 1, deposition was performed by a plasma-assisted aerosol deposition method using an $Er_3Ga_5O_{12}$ powder as a raw material, which was obtained by synthesizing an $Er_2O_3$ powder reagent and a $Ga_2O_3$ powder reagent by a solid phase reaction and ground by a ball mill. The average particle diameter of the raw powder was 0.7 μm. As the deposition conditions, a flow rate of the Ar gas was set to 20 L/min, the plasma output was set to 2 kW, the chamber pressure was set to 105 Pa, the stage movement speed in the X direction was set to 10 mm/sec, and the stage movement step in the Y direction was set to 1 mm.

Figure 7:
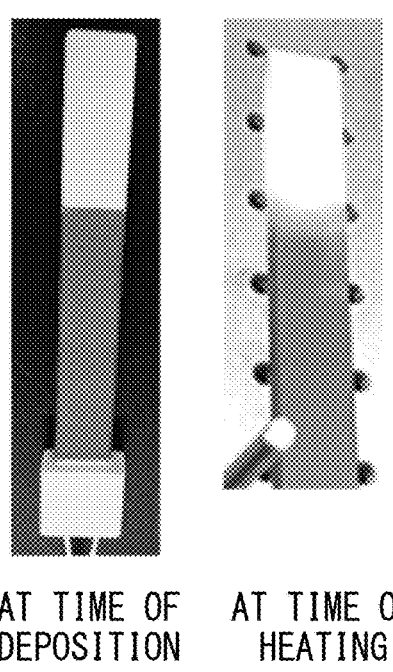
FIG. 7 is a photograph of exterior of a ceramic deposition heater when an $Er_3Ga_5O_{12}$ ceramic film is deposited on a silicon nitride heater (at the time of deposition) and a photograph of exterior of the ceramic deposition heater when it is heated (at the time of heating) according to Example 1.

By repeating the stage movement, an $Er_3Ga_5O_{12}$ (ErGG) ceramic film having a thickness of 40 μm and that having a thickness of 160 μm were obtained. FIG. 7 shows a photograph of exterior of a ceramic deposition heater when the ErGG ceramic film having a thickness of 40 μm was deposited on a silicon nitride heater (at the time of deposition) and a photograph of exterior of the ceramic deposition heater when it was heated to about 1000° C. (at the time of heating).

Even after the ErGG ceramic film was heated, cracks or peeling were not generated. Further, the ErGG ceramic film having a thickness of 160 μm was also deposited on the silicon nitride heater and the exterior thereof when it was heated was observed, but little difference in appearance was observed.

Figure 8:
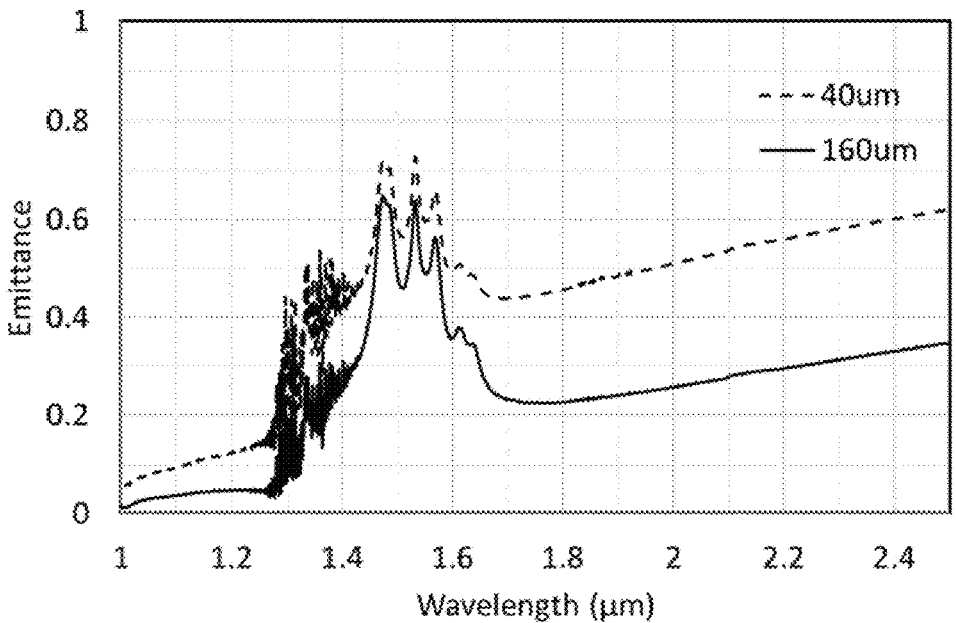
FIG. 8 is a diagram showing an emissivity spectrum obtained by performing FT-IR measurement on a thermal radiation light from the $Er_3Ga_5O_{12}$ ceramic film deposited on the ceramic deposition heater according to Example 1.

FIG. 8 shows an emissivity spectrum obtained by performing FT-IR measurement of the thermal radiation light from the ErGG ceramic film deposited on the silicon nitride heater according to Example 1. FIG. 8 shows an emissivity spectrum measured by heating the surface temperature of the ErGG ceramic film to about 1000° C. by the silicon nitride heater. As shown in FIG. 8, the wavelength selectivity thermal radiation was recognized in each of the ErGG ceramic film having a thickness of 40 μm and the ErGG ceramic film having a thickness of 160 μm.

The ErGG ceramic film is selected as an emitter corresponding to a GaSb photoelectric conversion cell. While the band gap wavelength of GaSb is 1.7 μm, the manufactured ErGG ceramic film exhibits a wavelength selectivity that matches its wavelength. The ErGG ceramic film having a thickness of 160 μm shows a higher wavelength selectivity than that of the ErGG ceramic film having a thickness of 40 μm.

Example 2

Figure 9:
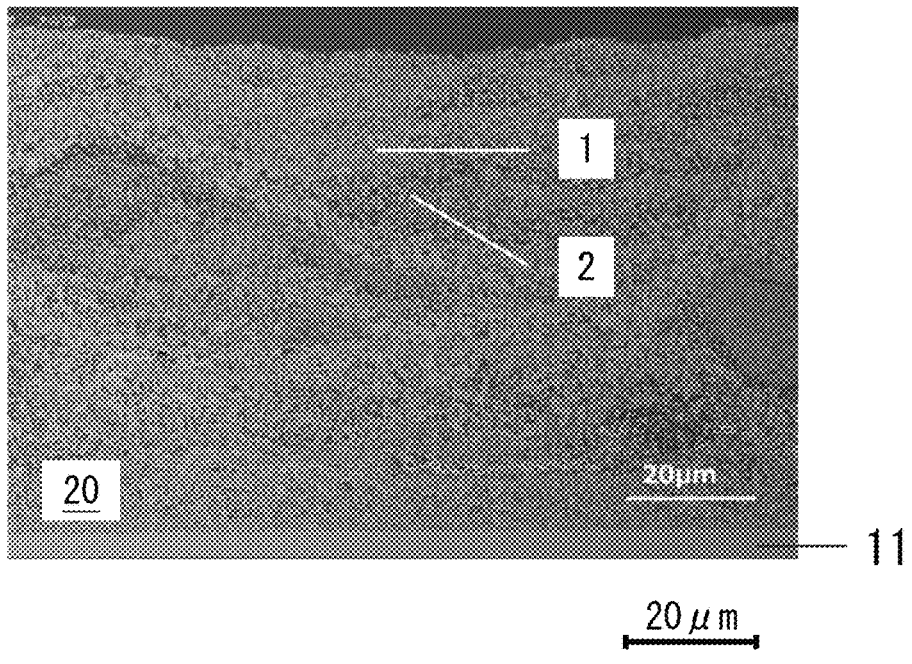
FIG. 9 shows an SEM image showing a cross section of an $Er_3Ga_5O_{12}$ ceramic film deposited on an inconel substrate according to Example 2.
Figure 10:
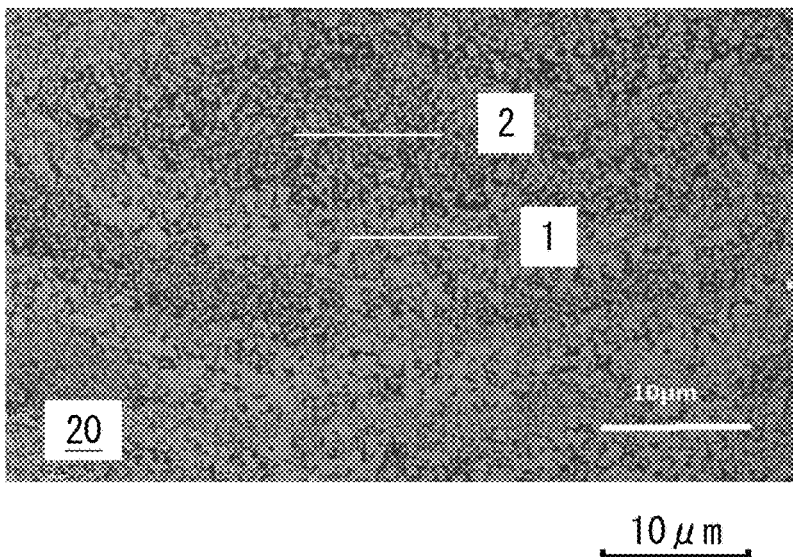
FIG. 10 shows an enlarged image of an area near a center of the ceramic film shown in FIG. 9 in the thickness direction.
Figure 11:
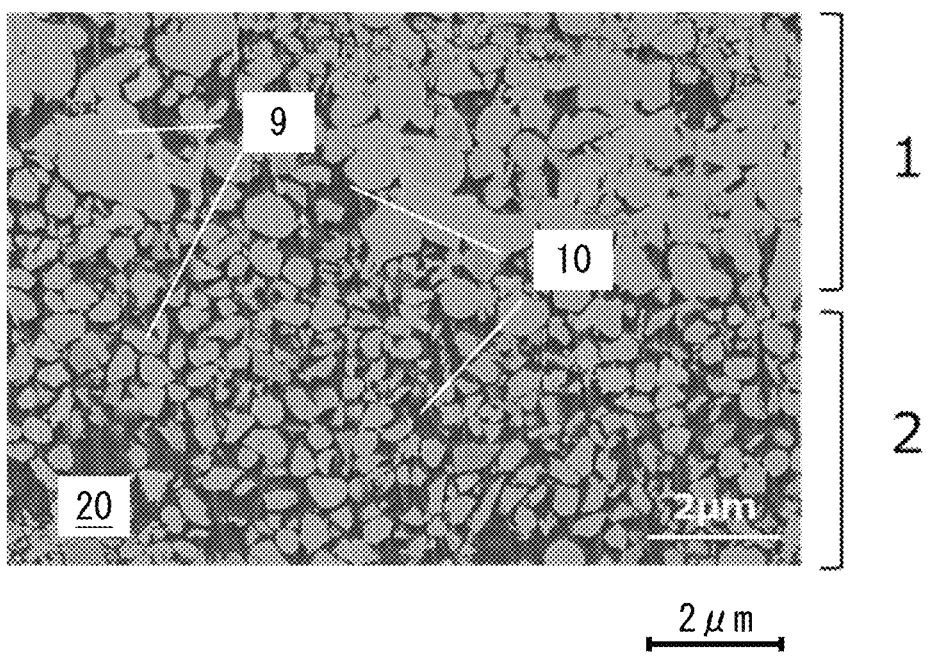
FIG. 11 shows an enlarged image obtained by further enlarging the image shown in FIG. 10.

FIGS. 9 to 11 show results of SEM observation after an ErGG ceramic film was deposited on an inconel alloy substrate, which is a base material, and cross-sectional processing by ion polishing was performed under deposition conditions similar to those in Example 1. FIG. 9 shows a low-magnification SEM image. FIG. 9 shows that there are an inconel alloy substrate 11, a high-density region 1 with a bright contrast, and a low-density region 2 with a dark contrast.

FIG. 10 is an enlarged view of an area near the center of the ceramic film shown in FIG. 9 in the thickness direction. FIG. 10 shows that the high-density region 1 and the low-density region 2 form layers. The thickness of each of the layers is about 4 μm to 10 μm.

FIG. 11 shows an enlarged image obtained by further enlarging the ceramic film shown in FIG. 10. FIG. 11 shows that the low-density region 2 is formed of particles having a particle diameter of 1 μm, whereas the high-density region 1 is formed of particles having a particle diameter of over 1 μm since sintering of particles proceeds in the high-density region 1. It can be considered that these structures can be obtained by performing deposition while moving the substrate relative to the nozzle 3 by using the plasma-assisted aerosol deposition device 200. Further, the porosity calculated by analyzing the SEM image shown in FIG. 11 was 40%.

Figure 12:
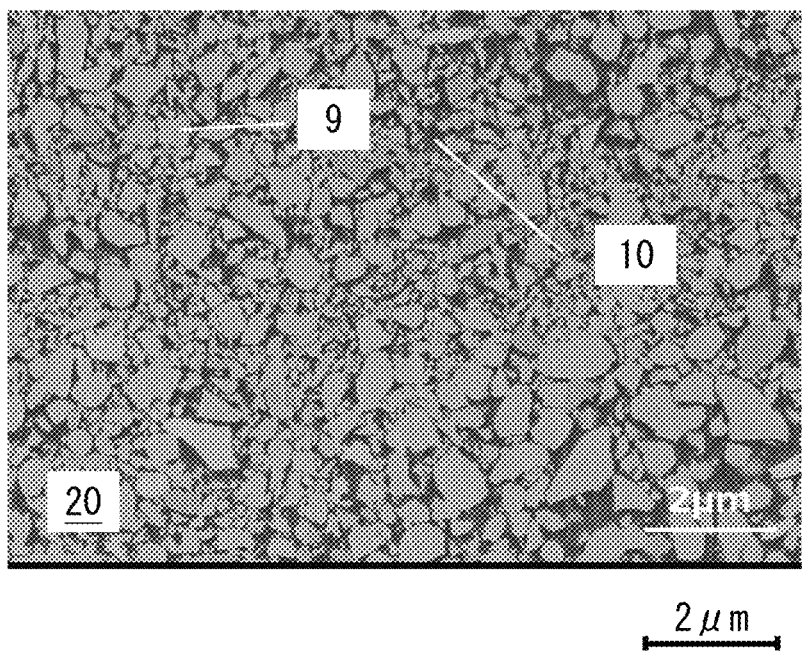
FIG. 12 shows an enlarged image of an area near a surface of the ceramic film shown in FIG. 9.
Figure 13:
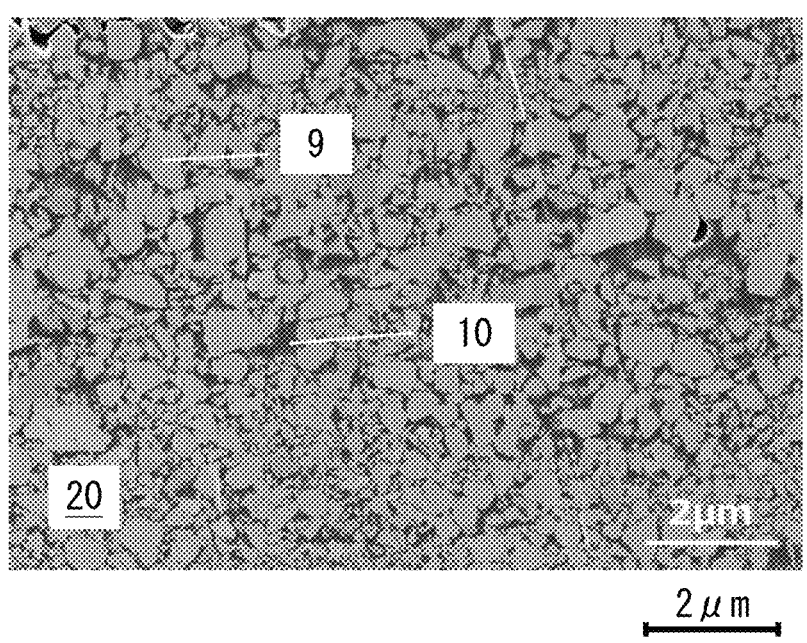
FIG. 13 shows an enlarged image of an area near a substrate interface of the ceramic film shown in FIG. 9.
Figure 14:
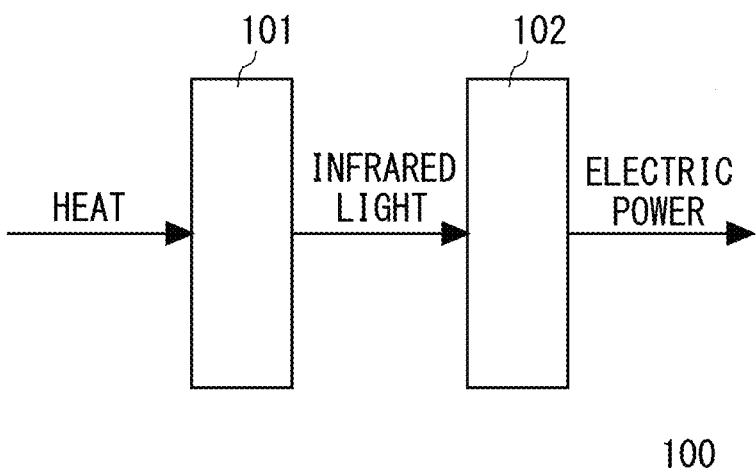
FIG. 14 is a schematic view showing a basic configuration of the thermophotovoltaic power generation device.

FIG. 12 shows an enlarged image of an area near a surface of the ceramic film shown in FIG. 9. Further, FIG. 13 shows an enlarged image of an area near a substrate interface of the ceramic film shown in FIG. 9. The porosities calculated by analyzing these SEM images were 38% and 33%, respectively.

As described above, it has been confirmed that the ceramic film 20 including the high-density regions 1 and the low-density regions 2 according to the example embodiment has wavelength selectivity thermal radiation suitable for the emitter 101A of the TPV power generation device 100 and has high heat resistance. Further, it has been confirmed by the SEM observation that the ceramic film 20 including the high-density regions 1 and the low-density regions 2 according to the example embodiment was obtained by a plasma-assisted aerosol deposition method. It can be considered that the ceramic film 20 according to the example embodiment has a high heat resistance since it includes the low-density region 2 therein.

As described above, according to the example embodiment, it is possible to provide an emitter for TPV power generation having an excellent wavelength selectivity formed of a ceramic film with no peeling from a base material or breakage even after the heating and cooling cycles. Further, it is possible to provide a method for manufacturing an emitter formed of the above ceramic film.

Note that the present invention is not limited to the above-described example embodiment and may be changed as appropriate without departing from the spirit of the present invention.

While the present invention has been described with reference to the example embodiment, the present invention is not limited to the above-described example embodiment. Various changes that can be understood by those skilled in the art within the scope of the invention may be made to the configurations and the details of the present invention.

This application is based upon and claims the benefit of priority from Japanese patent application No. 2022-070623, filed on Apr. 22, 2022, the disclosure of which is incorporated herein in its entirety by reference.

REFERENCE SIGNS LIST

1 HIGH-DENSITY AREA
2 LOW-DENSITY AREA
3 NOZZLE
4 RF COIL
5 CERAMIC POWDER AEROSOL
6 AEROSOL PASSING PLASMA PART
7 BASE MATERIAL
8 NOZZLE CENTER TRAJECTORY
9 PARTICLE
10 PORE
20 CERAMIC FILM
100 TPV POWER GENERATION DEVICE
101 EMITTER
101A EMITTER
102 PHOTOELECTRIC CONVERSION CELL
200 PLASMA-ASSISTED AEROSOL DEPOSITION DEVICE

The invention claimed is:

1. A ceramic film that is formed on a thermal source, converts heat from the thermal source into an infrared light and has pores, the ceramic film comprising:

a plurality of high-density regions, which are small porosity regions having a density higher than an average density of the entire ceramic film; and a plurality of low density regions, which are large porosity regions having a density lower than the average density of the entire ceramic film, wherein the plurality of high density regions and the plurality of low density regions are alternatively stacked in layers.

2. The ceramic film according to claim 1, wherein the ceramic film is composed of an oxide ceramic containing a rare-earth element.

3. The ceramic film according to claim 2, wherein a composition of the ceramic film is $R_3Ga_5O_{12}$ or $R_3Al_5O_{12}$ (R: rare-earth element).

4. The ceramic film according to claim 1, wherein a particle diameter of each of ceramic particles in the plurality of low-density regions is 1 μm or less.

5. The ceramic film according to claim 1, wherein the ceramic film includes at least one of:

a plurality of low-density portions provided in the plurality of high-density regions; and a plurality of high-density portions provided in the plurality of low-density regions.

6. A method for manufacturing a ceramic film, the method comprising forming the ceramic film according to claim 1 on the thermal source by a plasma-assisted aerosol deposition method.

7. The method for manufacturing the ceramic film according to claim 6, comprising moving the thermal source relative to a nozzle that ejects aerosol containing raw powder to form the ceramic film on the thermal source.

8. A thermophotovoltaic power generation device comprising:

an emitter formed of the ceramic film according to claim 1 formed on the thermal source, the emitter being configured to convert heat from the thermal source into the infrared light; and a photoelectric conversion cell configured to convert the infrared light emitted from the emitter into an electric power.

* * * * *